United States Patent [19]

Kimball

[11] 3,732,380

[45] May 8, 1973

[54] SAMPLE AND HOLD REMOTE CONTROL FOR FM TAPE DECKS

[76] Inventor: Robert L. Kimball, 725 Saddlewood Avenue, Dayton, Ohio 45459

[22] Filed: Jan. 4, 1972

[21] Appl. No.: 215,346

[52] U.S. Cl. ......................179/100.2 B, 340/174.1 G, 340/174.1 K

[51] Int. Cl. ..........................................G11b 15/20

[58] Field of Search ................179/100.2 B, 100.2 S; 340/174.1 C, 174.1 G, 174.1 K; 178/6.6 A

[56] References Cited

UNITED STATES PATENTS

| | | | |
|---|---|---|---|
| 3,270,930 | 9/1966 | Emerson | 179/199.2 B |
| 3,342,932 | 9/1967 | Bounsall | 179/199.2 B |
| 3,571,525 | 3/1971 | Miller | 179/100.25 |
| 3,463,877 | 8/1969 | Crum | 179/100.2 B |
| 3,633,187 | 1/1972 | Proctor | 179/100.2 B |

*Primary Examiner*—Bernard Konick
*Assistant Examiner*—Jay P. Lucas
*Attorney*—Harry A. Herbert, Jr.

[57] ABSTRACT

When the hold button is pushed the signals to the FM discriminators are switched from the signals on the tape to the signals from the record oscillators, which are tracking the signals on the tape (the recording heads are disconnected), and the output from the record oscillators provide constant hold signals. As the tape coasts to a stop the cycles of FM signal on the tape are counted by a counter. When the tape is rewound the total number of FM cycles the tape runs (including in the backward direction rewind coast) is counted. Then when the tape is placed in forward position again when the position on the tape passes the playback heads at which the hold was initiated the held signals are removed and normal operation continues from substantially the position at which the hold was initiated.

5 Claims, 16 Drawing Figures

PATENTED MAY 8 1973

3,732,380

PATENTED MAY 8 1973

3,732,380

SHEET 06 OF 12

SAMPLE AND HOLD REMOTE CONTROL FOR FM TAPE DECKS

BACKGROUND OF THE INVENTION

The field of this invention is in the art of controlling tape transport mechanisms.

Many testing procedures are run from a prerecorded testing tape. For instance, in testing a new airplane wing design the typical loadings at various places on a wing in a typical maneuver are known from previous experiences. These data are programmed into a magnetic frequency modulated testing tape. The output from the tape controls loading devices that place representative loads on the new wing, simulating the stresses the wing would experience in actually flying the particular maneuver. Many times it is highly desirable to stop the test at a particular point to examine in detail the conditions then existing. It is obvious that the static conditions being held must be those of the last dynamic condition, and that when the dynamic testing is resumed it should continue smoothly from the last dynamic conditions being held static without any disruptive jumps or transients. In the simple conventional test setup the tape can't be stopped because the signals going to the load controllers would go to the extreme negative limit causing disastrous physical results during deceleration and stopping of the tape. When simple signal holding circuits are used to hold the output signals at the levels they were when the stop button was pushed a problem exists in restarting the tape due to the tape travel in coasting to a stop. If forward motion is initiated from this stopping point the signals are indefinite during the acceleration period, a serious transient can occur, and an interval of the test is omitted as represented on the tape during the coast and accelerate periods. Generally multitrack FM recordings are used with each track controlling a particular load controller. Instead of physical loadings, temperatures, vibration frequencies, or other variables necessary to the particular testing involved are programmed on the tape and through suitable controllers the specimen under test is subjected to the conditions programmed. The problems of starting, stopping and rewinding tape recordings are well known. The instant replays frequently seen on television presents one type of problem, however those encountered in programmed testing procedures are generally much more severe. U.S. Pat. Nos. 3,180,930 and 3,342,932 issued to patentee Bounsall, and 3,344,417 issued to patentee Boyle are typical examples of the prior art.

SUMMARY OF THE INVENTION

An electronic circuit cooperating with a conventional FM tape recorder, a conventional counter, and a conventional signal holding amplifier provides a system that enables an operator to stop a programmed tape, hold the signal present at the initiation of the stop, and resume operation of the program from the point of stopping.

DESCRIPTION OF THE PREFERRED EMBODIMENT

Figures 1, 2, 3:
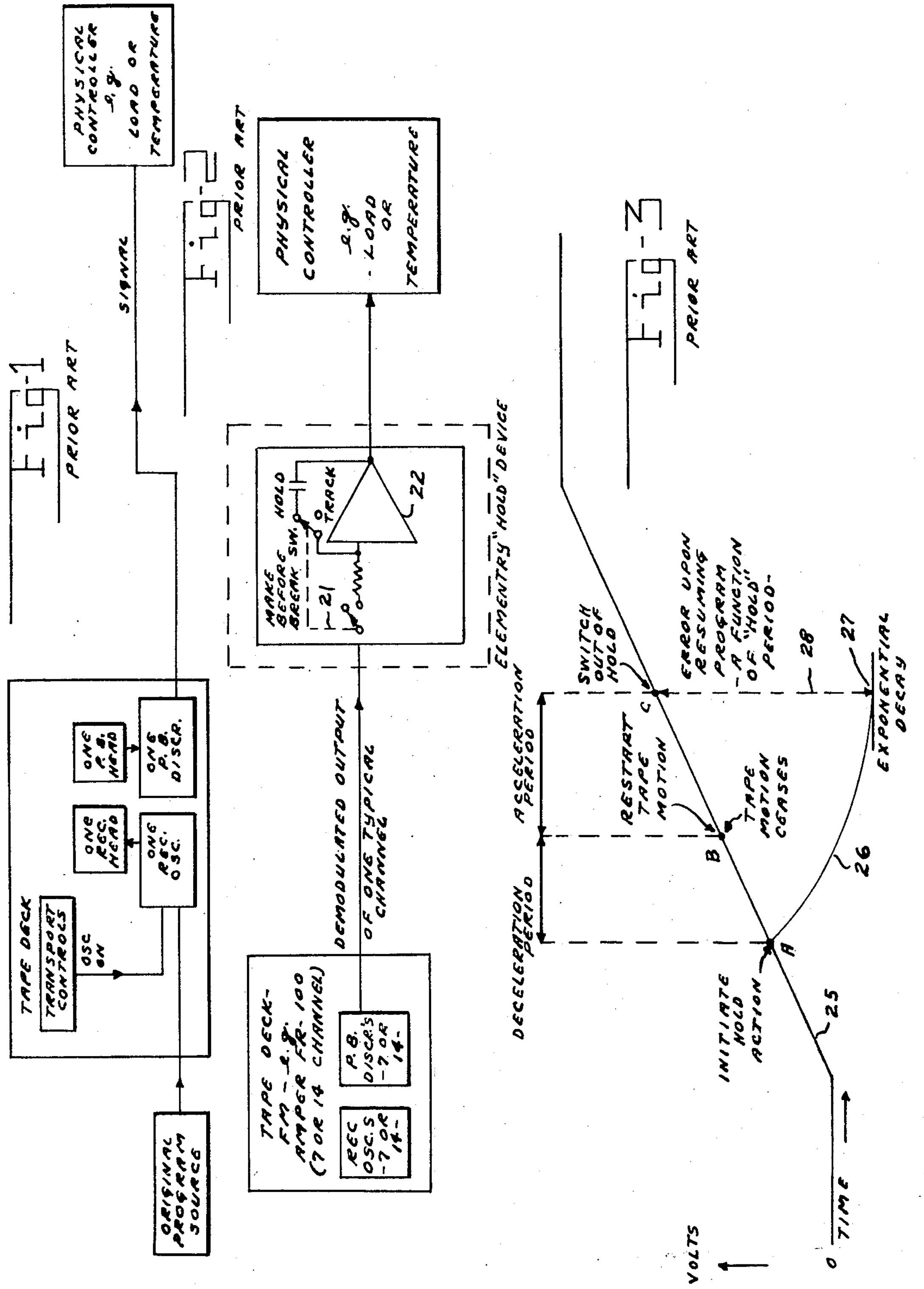
FIG. 1 is a block diagram of a conventional prior art system using an FM tape recorder to control physical testing parameters.
FIG. 2 is a more complex prior art system having an electronic hold circuit that maintains a signal to the controllers while the tape motion is stopped.
FIG. 3 is an analysis diagram of the operation of the system of FIG. 2.

FIG. 1 shows a typical prior art system in which a programmed test sequence, FM recorded on magnetic tape, is used to provide signals to controllers which vary the physical parameters to which the object being tested is subjected. Generally a plurality of controllers are actuated each from a separate track on the tape. In this system the tape cannot be stopped to observe statically a point in the dynamic sequence because upon stopping the tape the input signals to the controllers go to the extreme negative limit and the physical stresses provided by the controllers are drastically changed. The sudden removal of loads such as pressure generally is only done in emergency situations. An improvement in this system, also in the prior art, is shown in FIG. 2. In this system switch 21 is operated simultaneously with the stop switch on the tape deck. The operational amplifier 22 has a relatively long time constant integrating input thus the signal present on the controllers at the initiation of the stop switch is held within the discharge characteristics of the integrating system. The typical operation of this system, as represented by a single track, is shown graphically in FIG. 3. The signal from a single track to a controller is represented by the line 25. In this example, it is a typical rising voltage over a period of time. When the stop button is pushed and switch 21 placed in hold at point A the signal represented as a certain voltage present at that point is held by the integrating operational amplifier 22 within its capabilities. The voltage held decreases at an expontential rate as indicated by line 26. (The drawing is exaggerated for illustration.) When the hold button was activated with the signal at a level as represented at A the tape coasted on to point B in the programmed signal before stopping. Then when the tape was started an acceleration period takes place before useable signal is obtained taking the programmed signal on up to point C. Now when the hold is removed the held signal which had decreased to point 27 and the programmed signal at point C is applied a serious transient as represented by the voltage span of dotted line 28 occurs in addition to the loss of the programmed signal between points A and C. It is to be noted that the longer the hold period is the larger will be the transient due to the exponentially decreasing voltage from the hold circuit.

The primary objects of this invention are to effectively start the resumption of the test program from the point at which it was stopped, furnish a constant hold signal to the controller representing the programmed test signal at the initiation of the hold, and thus also to substantially eliminate any transients upon the resumption of the test program.

Figure 4:
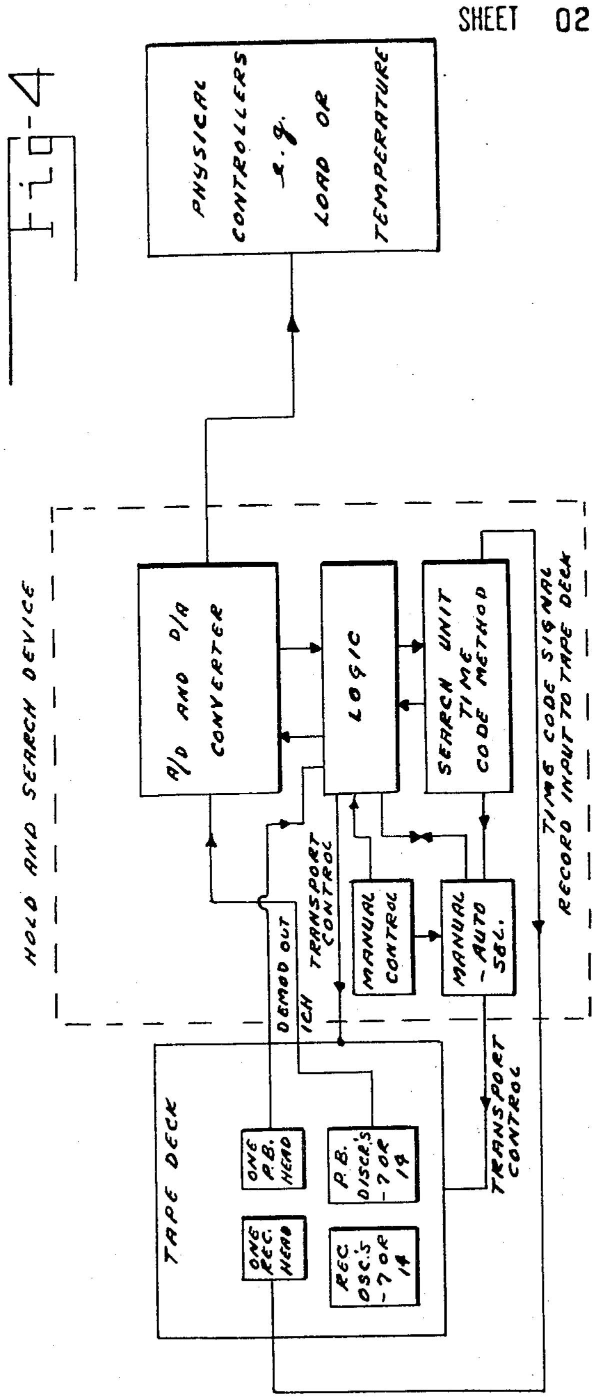
FIG. 4 is a block diagram of a system for providing a constant held signal employing an analog to digital and digital to analog converter and tape transport control through a separate track on the magnetic tape.
Figure 5:
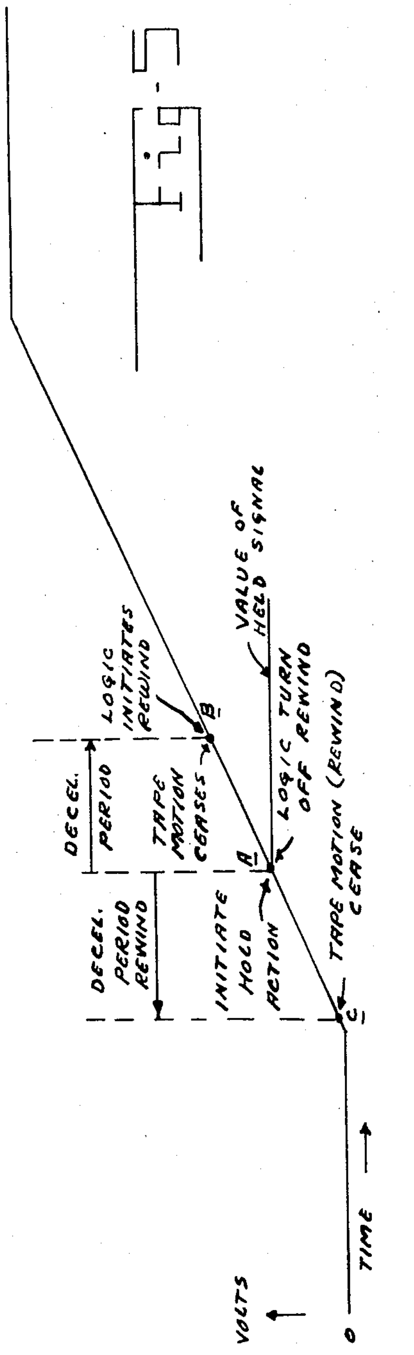
FIG. 5 is an analysis diagram of the operation of the system shown in FIG. 4.

FIG. 4 shows in block diagram form one system for accomplishing these objectives. In this system one of the tracks on the tape is allocated for a time code recording on which is recorded a time code signal indicative of the travel of the tape in either direction from the point of "hold." This time code through the logic circuitry and the search unit controls the transport mechanism of the tape deck and the digital hold circuit. The operation of the system may be more thoroughly understood by considering FIG. 5 which again is a plot of a typical signal increasing with time. The hold is manually initiated at point A. The signal then present is stored digitally in the analog to digital and digital to analog converter and furnished as a steady state signal to the controller. The tape coasts before stopping to a point such as represented by point B. While this coasting occurs the time coded signal recorded on the separate track on the tape is read by the system. Rewind, logically controlled, starts from point B and is shut off by the logic circuit as the tape (going in rewind) passes the point at which hold was initiated as indicated by the time code signal. The tape then coasts on in the rewind direction to a point such as C. At start up by manual command from point C acceleration to normal speed is reached before the point at which hold was initiated is reached and as the tape passes the original hold point A, as indicated by the time code signal, the digitally held signal is automatically removed and the test is resumed from the programmed material.

This system while effective is very expensive in that the necessary equipment is relatively complex and a track that could be used for a programmed test signal must be reserved for recording the time code control signal.

Figure 6:
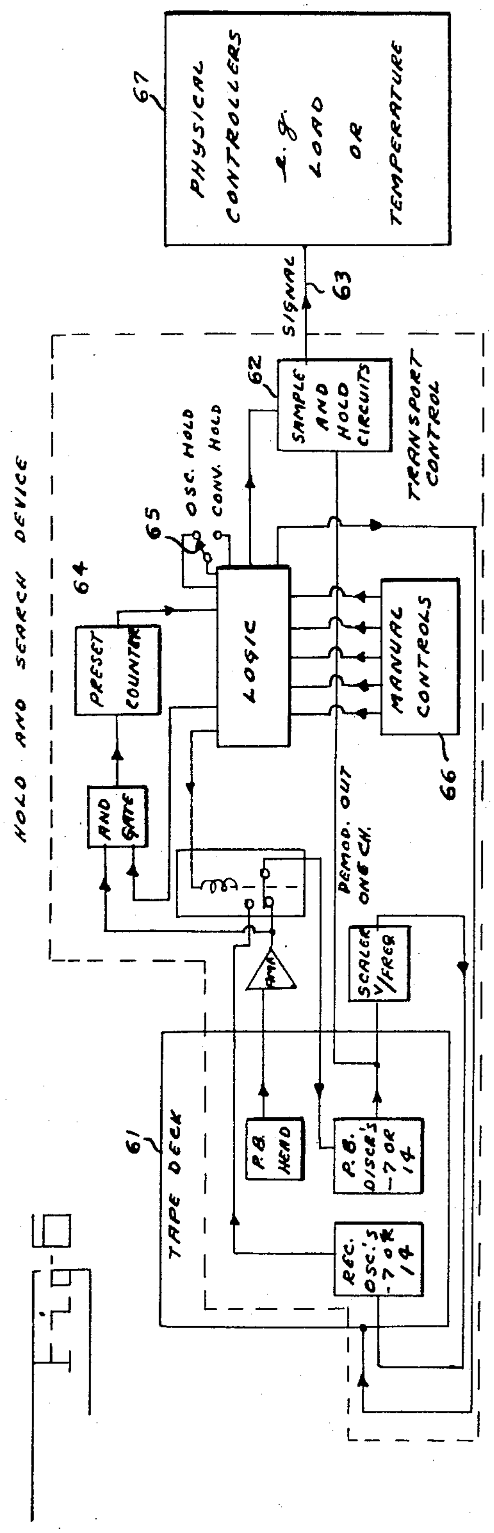
FIG. 6 is a simplified block diagram of a preferred embodiment of the invention.

A simplified block diagram of a preferred embodiment of the invention is shown in FIG. 6. The conventional tape deck 61 is a multichannel (generally 7 or 14 channels) FM recording and playback instrument. The Ampex type FR–100 is a typical example of such an instrument. For purposes of illustration, the application of this invention will be explained with reference to this particular instrument. It is to be understood that the invention may be used with all similar types of equipment. The invention uses as a control one of the normal programmed test channels. It does not require a separate channel. The control is applied to all the channels. Thus, there is a sample and hold circuit 62 for each channel, each with an output signal 63 to a respective controller. Also in the oscillator hold mode the recording oscillator for each track is switched into the closed loop to provide a substantially constant held signal during the hold period.

The improved holding action of this invention involves the application of two new concepts;

1. The connection of the FM recording oscillator so that it tracks with the output signal (i.e., varies its frequency in accord with the amplitude of the output of the FM discriminator), and, at the time hold action is desired, becomes a stage in a closed loop servo system. At this time the output of the oscillator becomes the input to the discriminator and the output of the discriminator is still the input to the oscillator. Thus, the drift of the held signal is negligible over any period of time, limited only by the stability of the oscillator. (The drift of the oscillator is assumed to be negligible, since this is the device which provides the "record" signals originally.), and 2. The use of a counting control system which counts carrier (± modulation) cycles from one of the program tracks and, with suitable circuitry, uses those counts which occur during deceleration and acceleration intervals as a measurement of distance. Since with standard IRIG heads the frequency is 900 cycles per inch ± 40 percent maximum modulation, the resolution in the worst case is 1/540th inch, and in the best case 1/1,260th inch. If extended or double-extended range (micro-gap) heads are used the resolution is twice or 4 times as good, respectively.

Thus, the system can be restarted at a point on the tape approximating the position at which hold was initiated, with a very high degree of accuracy. This is to be desired in order that the test profile may be unaltered by the random insertion of hold periods.

Conventional commercially available sample and hold circuits 62 are utilized in the system. An example of suitable instruments is the Burr-Brown type 4013/25. Other integrating operational amplifier type devices may readily be used. The preset counter 64 is also a conventional commercially available piece of apparatus. The Hewlett-Packard type 5332B is a suitable example of such an instrument. Again, other counters having preset count capabilities with an output signal may be used.

Two modes of operation of the apparatus are available to the operator by the operation of switch 65. In the "oscillator hold" mode the recording oscillators are used to furnish the hold signals and the conventional hold circuits 62 operate to hold the signals only during switching time. This mode is used especially for relatively long periods of hold. For relatively short periods of hold the "conventional hold" mode may be selected. The conventional hold mode may also be used as a "-back-up" type of operation in case of circuit failure and for tests and checks of the operation of the equipment. Generally the oscillator hold mode is the preferred mode of operation in that the variation in the held signals due to the normal decay in the integrating operational amplifiers in the sample and hold circuits are minimized.

Figure 7:
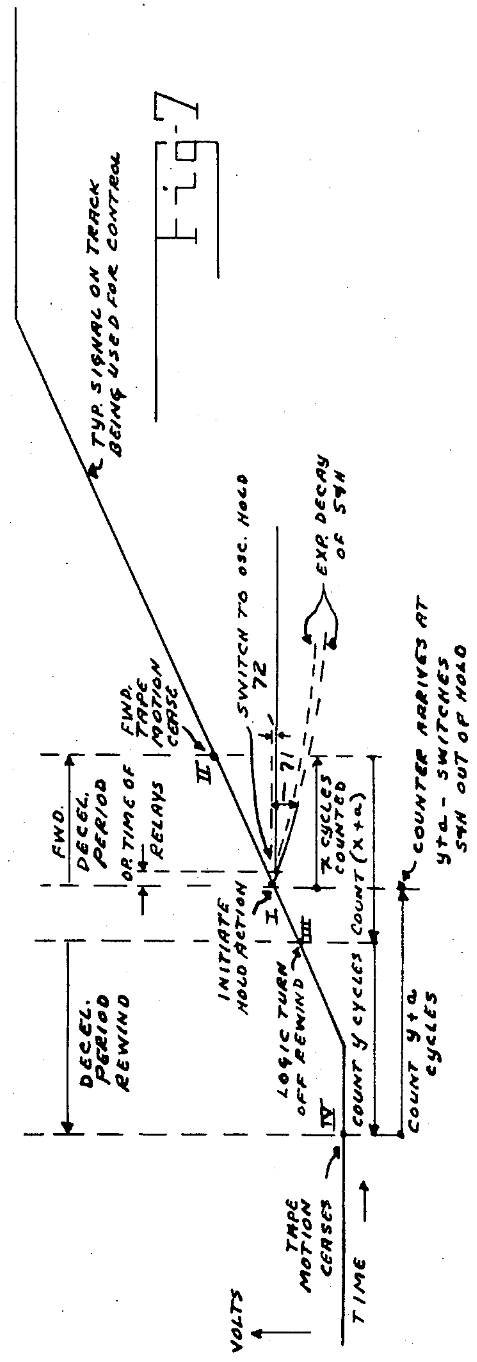
FIG. 7 is an analysis diagram of the typical operation of the preferred embodiment shown in FIG. 6 when operated in the "oscillator hold" mode.

FIG. 7 portrays a typical operation of the system in the oscillator hold mode of operation. The "error" signal or transient between the held signal and the signal obtained from the tape on resumption of the test program is represented by line 71. It is shown greatly exaggerated for illustration. It is composed of the slight decay 72 in the held signal in the sample and hold circuit during the operating time of the relays and the addition slight decay composing the remainder of the error signal 71 incurred during the time from the operation of the restart switch until the tape travels past the original point of hold. It is to be noted that in this mode of operation the error signal is not a function of the duration of the hold period.

Figure 8:
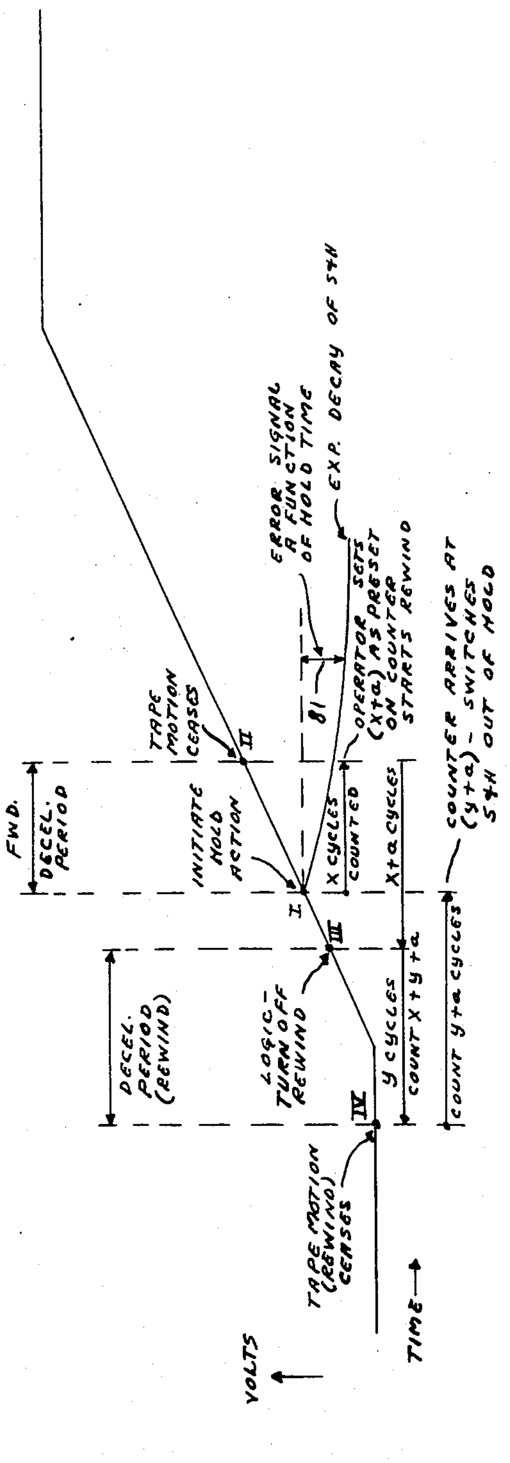
FIG. 8 is an analysis diagram of the typical operation of the preferred embodiment shown in FIG. 6 when operated in the "conventional hold" mode.

FIG. 8 shows a typical operation condition for operation in the "conventional hold" mode of operation. In this mode the hold signal is maintained by the sample and hold circuit only (i.e., the recording oscillators do not furnish the hold signals) and the held signals are subject to the decay characteristics of the sample and hold circuits and the error signal 81 is therefore a function of the hold time.

Before examining the logic and circuitry involved it will be helpful in understanding the invention to set forth a typical operating sequence in connection with the characteristics shown in FIGS. 7 and 8.

The operator has pushed the "initial start" button and the testing as programmed on the tape is in progress. (It is understood that the tape has been prerecorded and that test starting points of zero signal are known, such as by a footage counter, beginning of tape reel, or otherwise). The operator selects the type hold desired and operates toggle switch 65 accordingly. Then at the appropriate time that it is desired to halt the progress of the test the operator pushes the "hold" button. (Point I of FIG. 7) The counter 64 counts cycles as the tape decelerates to a stop. (Point II) The operator reads the counter and transfers this count "x" plus a predetermined count "a" to the preset limit switch dials of the counter. The predetermined count "a" is an arbitrary number, usually 1,000 or 2,000 counts are satisfactory. It is necessary only to assure that the tape will be up to speed as it passes the hold point when it is again placed in forward motion. With some tape decks where the deceleration travel at the end of rewind is always longer than the travel required for acceleration on restart "a" is not needed. The operator then pushes the "reset" and "start" switch buttons (in that order) on the counter 64. Next the operator pushes the "rewind" button on the control panel 66 of the hold and search device.

The tape starts traveling in the rewind direction from point II. The counter 64 counts to the preset limit ($x+a$) and automatically turns off the tape transport at point III. The tape decelerates to a stop at point IV, with the counter continuing to count the cycles passing the tape playback head during the deceleration.

The operator reads the new count composed of $x+y+a$, $y$ being the number of cycles occurring during the deceleration of the rewind. The operator substracts the original count of $x$ cycles from the new count ($x+y+a$) and enters the difference as a new setting on the preset limit switch of the counter. He then pushes the buttons "Reset" and "Start" on the counter in that order.

The equipment is now ready whenever desired to continue the dynamic testing as programmed on the tape (after a momentary startup period takes place). When the resumption of the programmed test is desired the operator pushes the "Restart" button in panel 66. The tape starts forward, the counter counts cycles from the tape to the preset limit ($y+a$), which places the tape at the original point of hold I, and automatically switches the system out of hold and the test proceeds with the controllers 67 being directly programmed from the tape.

The foregoing operating procedure applies to both the oscillator hold and the conventional hold modes. When a predetermined count "a" is used, the subtraction process for the operator is simplified when "a" is made large with respect to the original count "x" and is in integral thousands.

Figure 9:
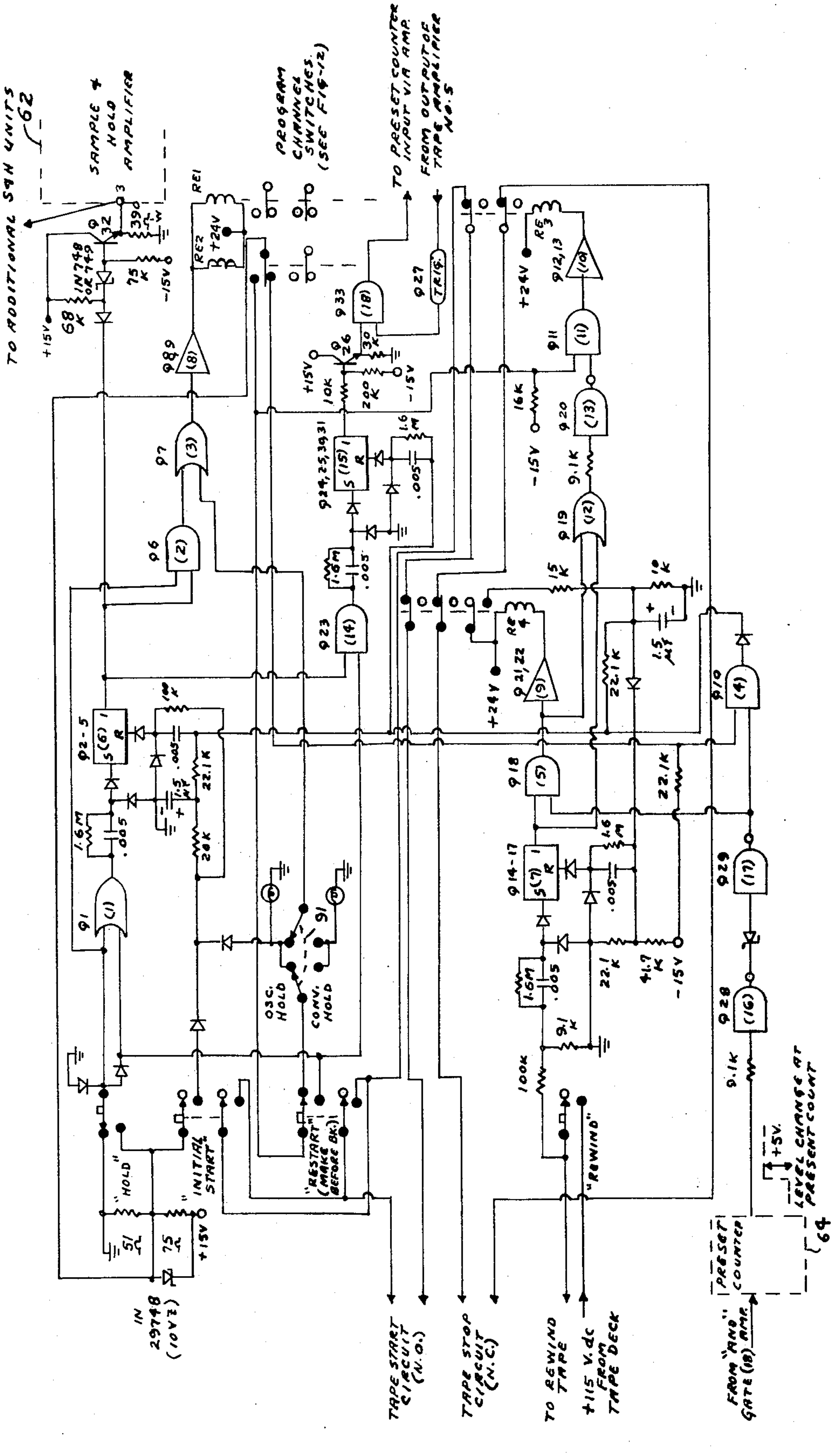
FIG. 9 is a logic diagram of the preferred embodiment shown in FIG. 6.
Figure 10:
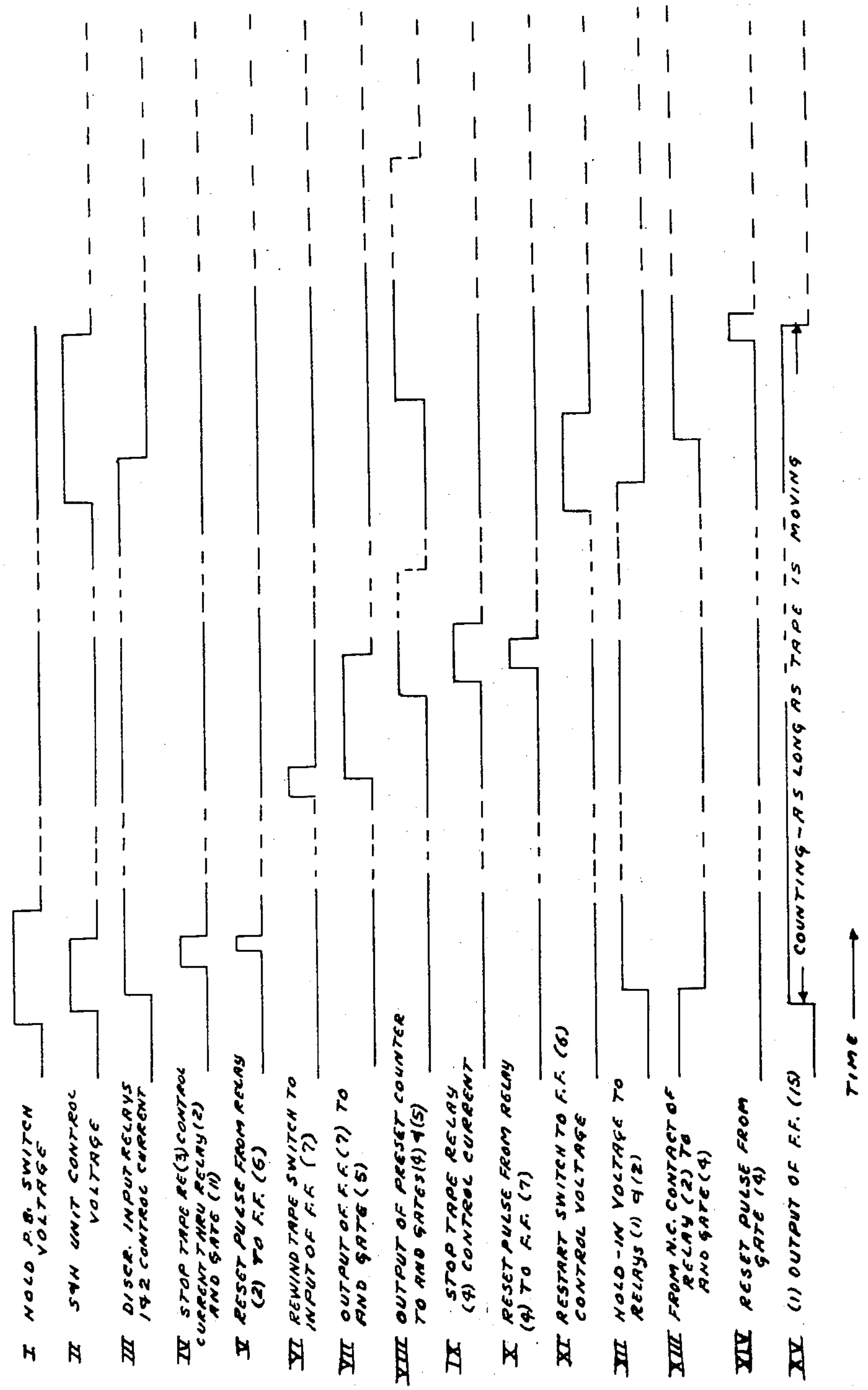
FIG. 10 is a representative time sequence diagram of the operation of the system in the "oscillator hold" mode.
Figure 11:
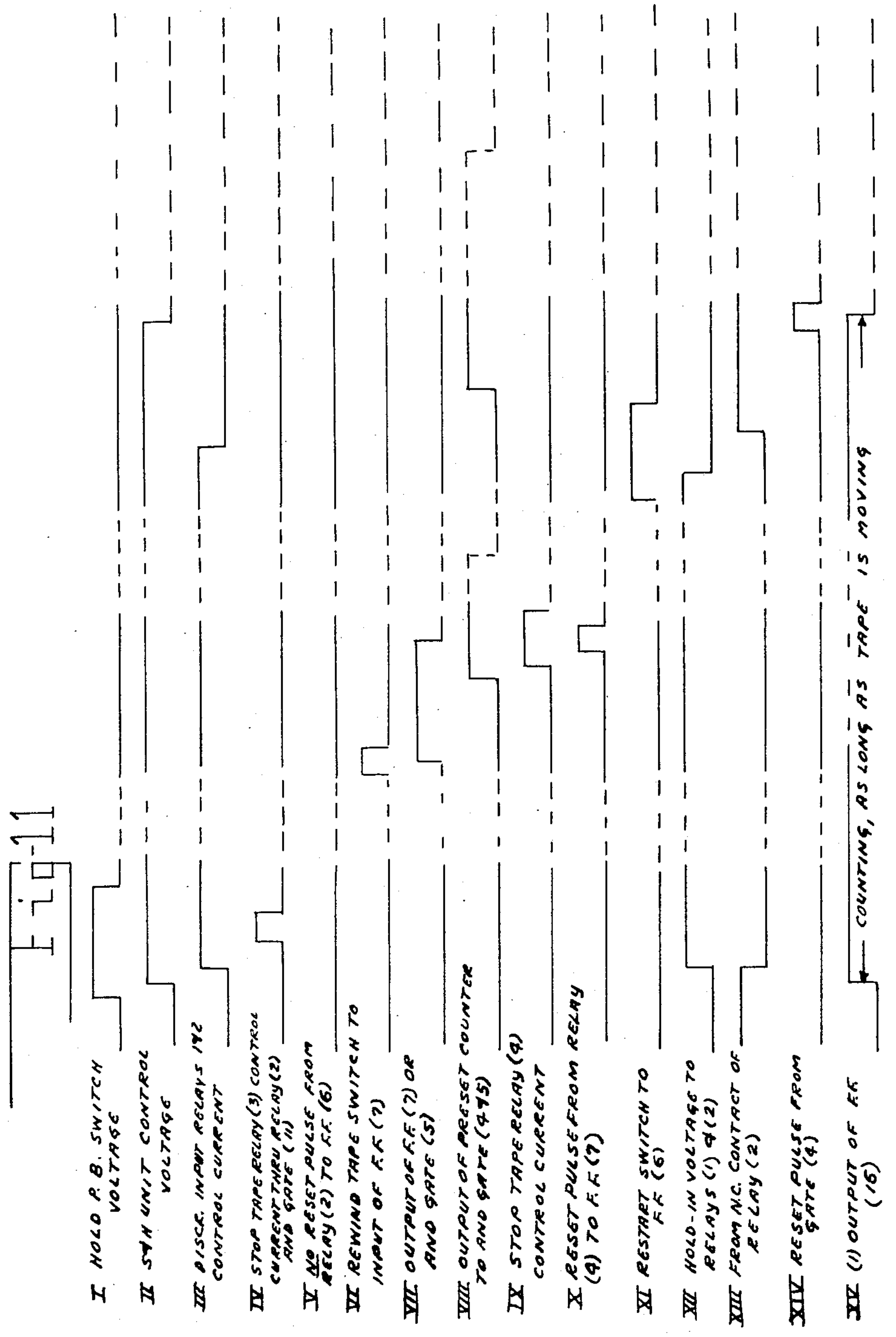
FIG. 11 is a representative time sequence diagram of the operation of the system in the "conventional hold" mode.

The structure of this invention may best be understood from the simplified logic diagram shown in FIG. 9 considered with the time sequence plots of FIGS. 10 and 11. For the detailed circuitry reference is made to FIGS. 12 through 16. The logic elements are numbered with parenthesis. The individual transistors as appear in the detail schematics are shown in corresponding "Q" numbers above the respective logic elements for ease in identifying them in the detailed schematic circuits. In a typical embodiment of the invention when used with a seven-track tape deck channel five was used for the control channel. It, channel five, was also a program channel. As previously explained the system of the preferred embodiment of the invention does not require the use of an additional channel. The standard magnetic tape and tape decks are generally seven or 14 channel. Of course, the invention is applicable to any number of channels from one to as many as the tape and tape deck provides. When for a particular test using seven track tape but a smaller number of programmed variables are recorded usually the tracks near the center of the tape are used. Obviously the channel used for control must be an active channel with a recorded program on it. In the embodiment set forth in detail six channels of program material were used. The seventh channel was reserved for purposes other than the programmed test. Thus, only six channel transfer switches are shown actuated from relays RE1 and RE2. The number of transfer switches used in embodiments of the invention will be in accord with the number of program channels used.

For operation of the system in the oscillator hold mode refer to the logic diagram of FIG. 9 and the time sequence Roman numerals lines of FIG. 10. Operation is as follows:

INITIAL START: Pusning "Initial Start" button provides reset for F.F.'s (6), (7), and (15) and, through N.C. contracts of relays (3) and (4), closes normally open circuit of tape deck thus causing tape to begin to move in forward playback mode. It may be necessary to hold in the "Initial Start" button for a fraction of a second to provide time for Relays (3) and (4) to release.

In anticipation of hold, toggle switch 91 is placed in Osc. hold position.

HOLD: (line I): Pushing "Hold" switch drives output of OR Gate (1) high, setting F.F. (6), whose output goes high, setting F.F. (15) and enabling AND gate (18) when pulses from carrier amplifier are present, and (line II): driving S. and H. amplifier 62 into Hold. The same switch action enables AND Gate (2), driving output of OR Gate (3) high, and, by means of Current Amplifier (8), pulls in relays (1) and (2), accomplishing the following:

1: (line III), switches all six channels of signal information from tape head amplifiers to FM oscillators, as source;

2: (line XII), applies latching voltage through N.C. contacts of "Restart" switch and "Osc. Hold"/"C onv.Hold" switch to input of OR Gate (3);

3: causes "Osc. Hold" lamp to light - by the same path;

4: (line XIII), removes high from AND Gate (4);

5: (line IV), provides a high to one input of AND Gate (11), which, since its other input is already high, turns on current amplifier (10), pulling-in relay (3), which opens normally closed Transport Stop circuit;

6: (line V), by the same path as in 2 above, plus series diodes and RC network, applies a somewhat integrated impulse to reset F.F. (6) and thus drives the S and H amplifier out of Hold. As the transport "coasts" to a stop the carrier freq. (incl. ± modulation) will be counted by the preset counter 64 and the total will be displayed. This number plus a predetermined number (if necessary), is entered, by manually turning the number wheels on the counter to set preset limit. After entering this number the "Reset" and "Start" buttons on the preset counter are operated, in that order.

REWIND: (During "Osc. Hold" Interval): Operation of "Rewind" p.b. switch connects + 115 vdc from tape deck back into tape deck to cause Rewind.

(line VI): Part of this voltage is coupled through RC and diodes to set F.F. (7);

(line VII): High on output of F.F. (7) causes one input to AND Gate (5) to go high; also it causes output of OR Gate (12) to go high. Through inverter (13) this becomes a low, turning off AND Gate (11) and thus causing RE (3) to fall out. This recompletes N.C. Tape Stop circuit, allowing Rewind to occur.

(line VIII): When Preset count is reached, level change of + 5v. appears on output line from Counter. (Note that, by line XIII, one input to AND Gate (4) is low, preventing the Gate providing a reset pulse to F.F. (6) when counter output goes high.) The +5 volt output is twice amplified and inverted by inverters (16) and (17) and applied to one input each of AND Gates (4) and (5).

(Line IX): Gate (5) output goes high, and, through current Amplifier (9), Relay (4) is pulled in, thus opening N.C. Transport Stop circuit.

(line X): Relay (4) also supplies an RC and diode coupled pulse, somewhat integrated, to reset F.F. (7). (Note that high output of (7) or of (5), or both, will prevent enabling of (11), thus precluding energization of Relay (3)).

Transport begins "coasting" to a stop, and counter continues counting — to somewhere beyond the preset value. When the tape stops moving the counter stops counting; the operator now substracts the preset number less the added predetermined number from the new displayed number, ($y-(x-a)$, see previous description), and enters the difference as a new preset value on the counter limit switches. He then pushes "Reset" and "Start" buttons, in that order, on the preset counter. System is now ready for Restart.

RESTART: (After "Osc. Hold" and "Rewind" Operations): Restart switch is "make before break" type. Pushing this switch causes the following actions:

1: (line XI), Plus voltage obtained through N.O. contact of Relay (2) drives output of OR Gate (1) high, setting F.F. (6) and driving S and H amplifier 62 into Hold. This also insures F.F. (15) is in "set" condition.

2: Other section of Restart switch "making" contact causes tape to start forward motion.

3: (lines XII and III), Delayed "break" of "Restart" switch opens holding circuit, through (3) and (8), and Relays (1) and (2) fall-out, changing signal inputs back again from Oscillators to Tape Head Amplifiers. "Osc. Hold" light is extinguished.

4: (line XIII), Fall-out of Relay (2) causes + voltage to be applied to one input of AND Gate (4).

5: (lines VIII and XIV), When preset count is reached, the output level change of the counter (+5 volts) is coupled through two inverter-amplifiers (16) and (17) and drives AND Gate (4) output high. By means of diode and the RC coupling circuits the output of (4) becomes reset pulses for F.F.'s (6), (7) and (15);

6: (lines XIV and II), Resetting of F.F. (6) drives S and H amplifier unit out of Hold.

7: (lines XIV and XV), Resetting of F.F. (15) opens shunt path for carrier freq. signals and the counter stops. However, the counter's output is still high so the operator now pushes "Reset" and "Start" buttons on counter in order to be ready for next "Hold" operation, if and when desired.

For the logic and sequence when the system is operated in the "conventional hold" mode reference is made to FIG. 9 and the time sequence chart shown in FIG. 11. The differences in this mode of operation from that of the foregoing mode is as follows:

HOLD: ("Conventional Hold"): Operating "Hold" push-button initiates actions similar to those in "Osc. Hold" sequence, except:

4: causes "Conv. Hold" lamp to light.

7: (Lines V and II), Provides no reset pulse to F.F. (6) at this time; thus the S and H unit 62 remains in "Hold" condition.

Remainder of sequence is same as in "Osc. Hold" mode; i.e., relay operations, counter operations, etc. Of course, Relays (1) and (2) switch signal paths (as above) from tape head amplifiers to oscillators, etc., but this feature is not used, since the S and H unit remains in the "Hold" condition.

REWIND: (During "Conventional Hold" Interval): This is the same sequence as in "Rewind during 'Osc. Hold' Interval." Note: In "Conv. Hold" and in the associated subsequent "Rewind" operations, actions are taking place which really are not necessary to the convention hold mode of operation, however, they do no harm, and eliminating them would result in expensive, time-consuming (in design) complications.

RESTART: (After "Conv. Hold" and "Rewind" operations); Same as "Restart after 'Osc. Hold' and 'Rewind' operations," except: the set pulse going to F.F. (6) is unnecessary, but not harmful.

Figure 12:
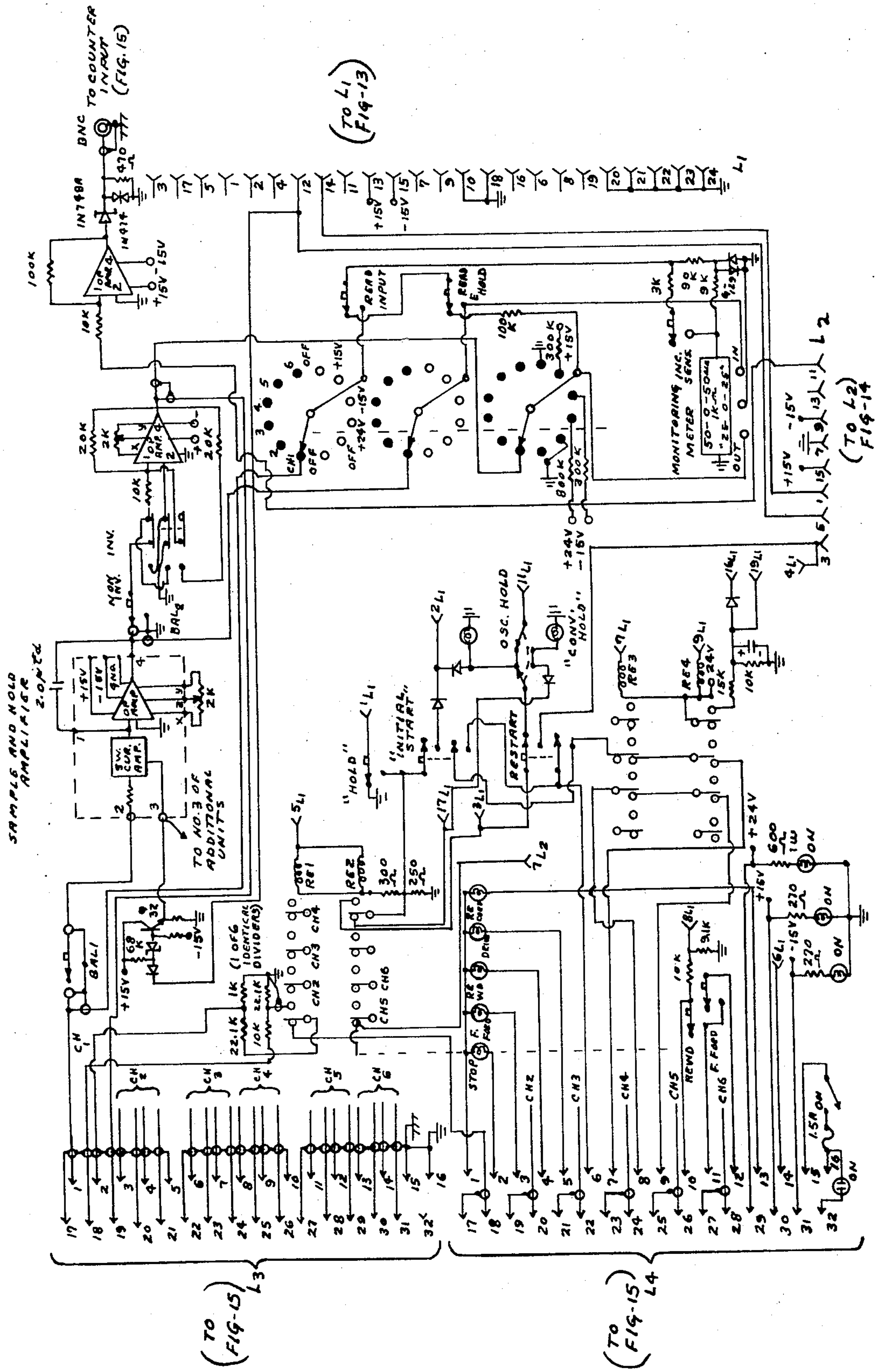
FIG. 12 is a partial schematic diagram of the circuit showing the primary control switches with interconnections to the circuits of the following FIGS. 13, 14 and 15.
Figure 13:
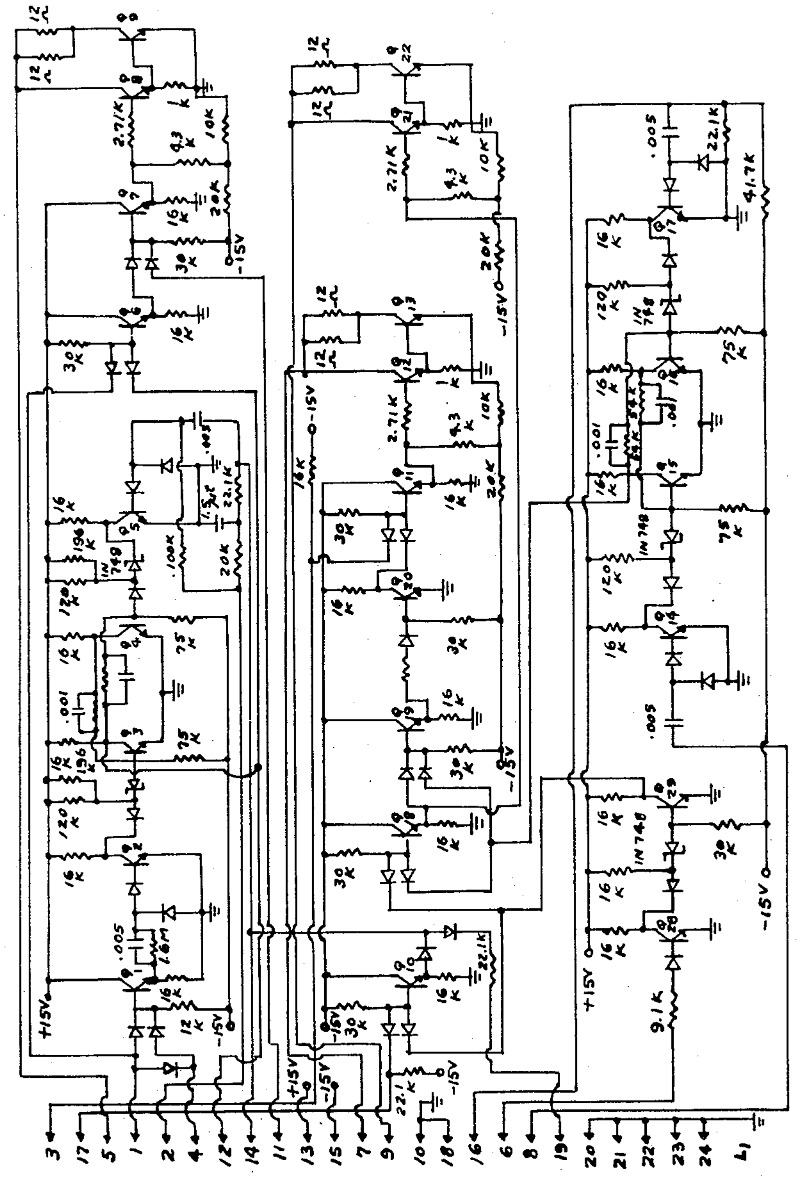
FIG. 13 is a partial schematic diagram of the logic circuits shown in FIG. 9.
Figure 14:
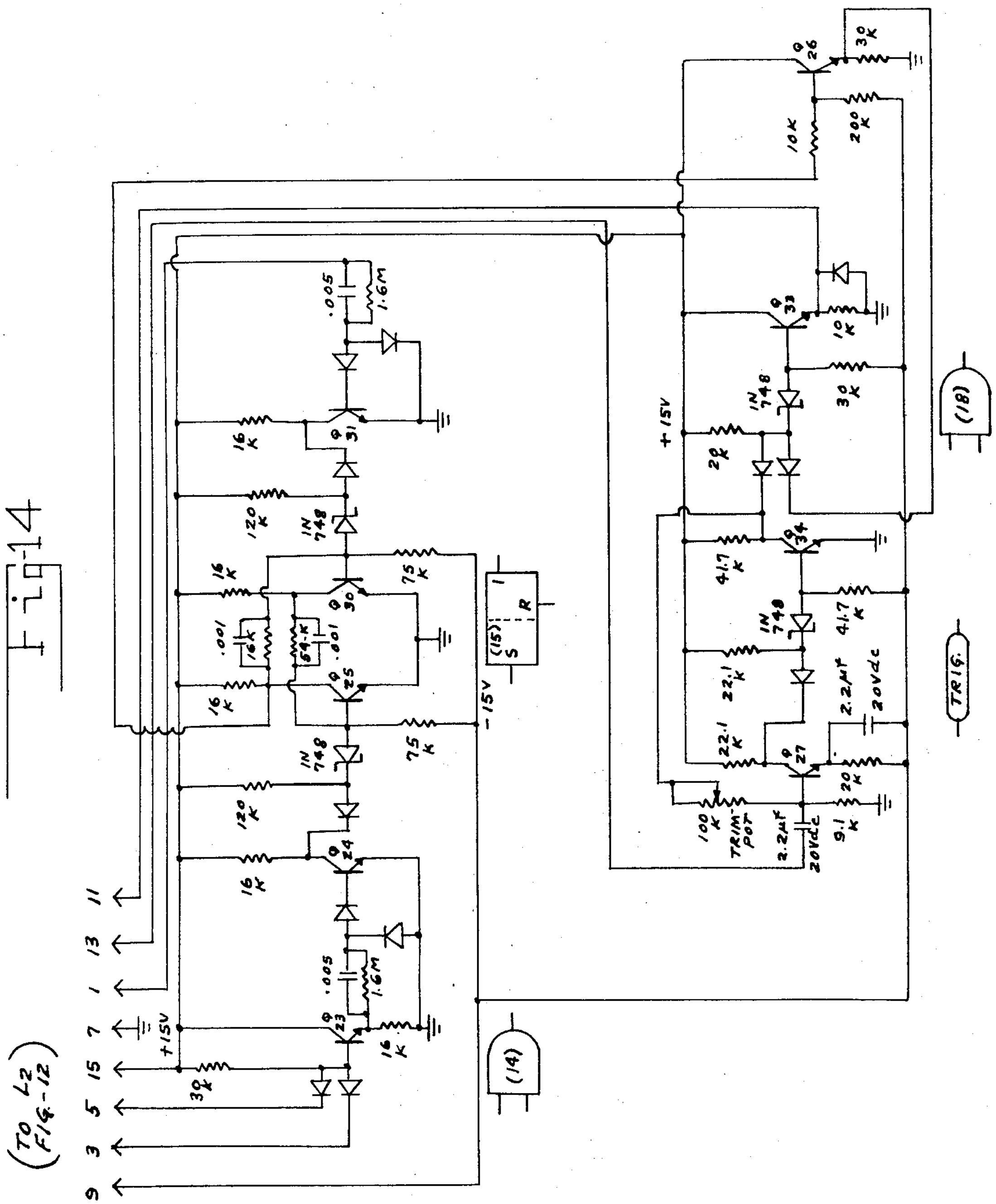
FIG. 14 is a schematic diagram of the remainder of the logic circuits shown in FIG. 9.
Figure 15:
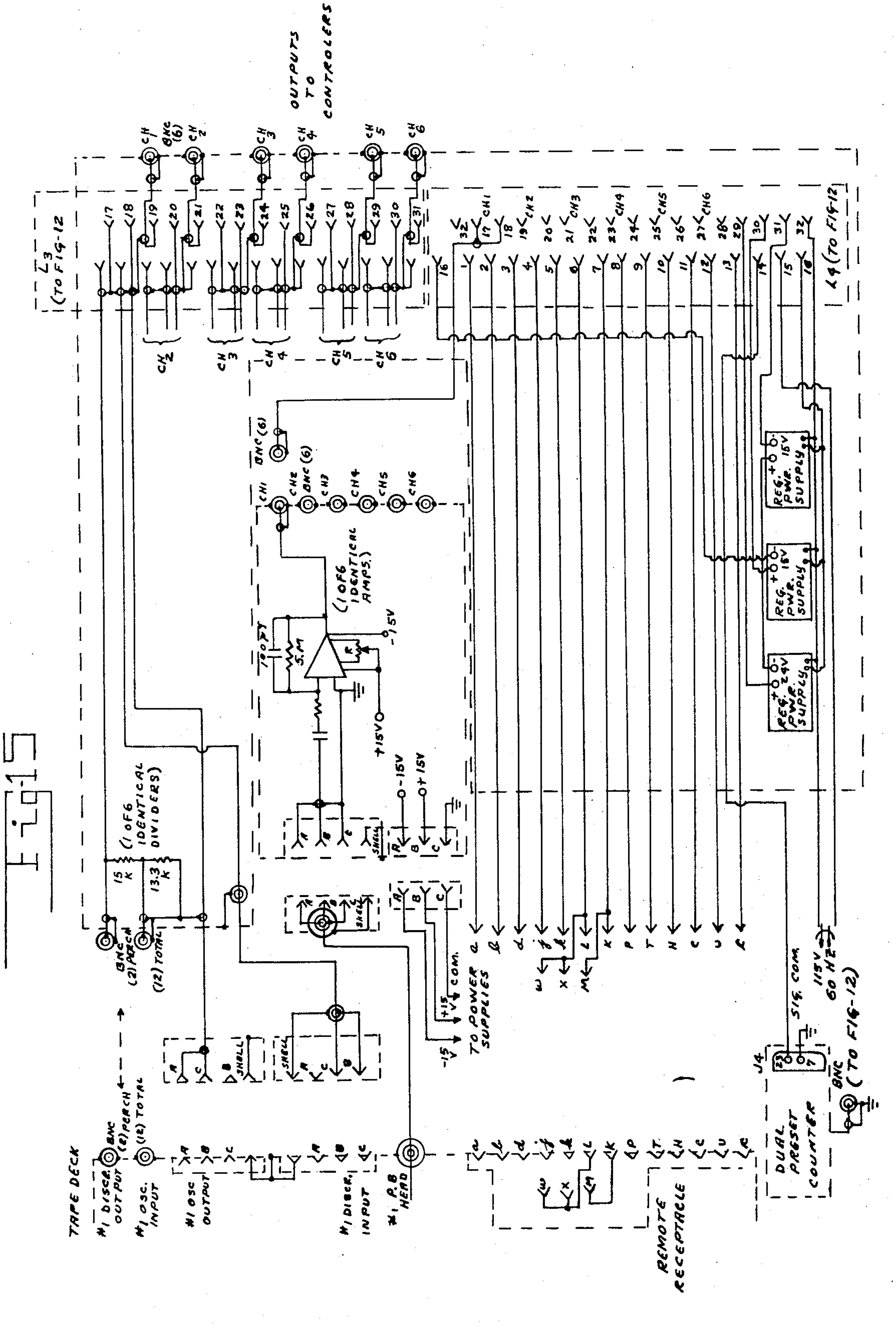
FIG. 15 is a schematic diagram showing the interconnections with a typical tape deck.
Figure 16:
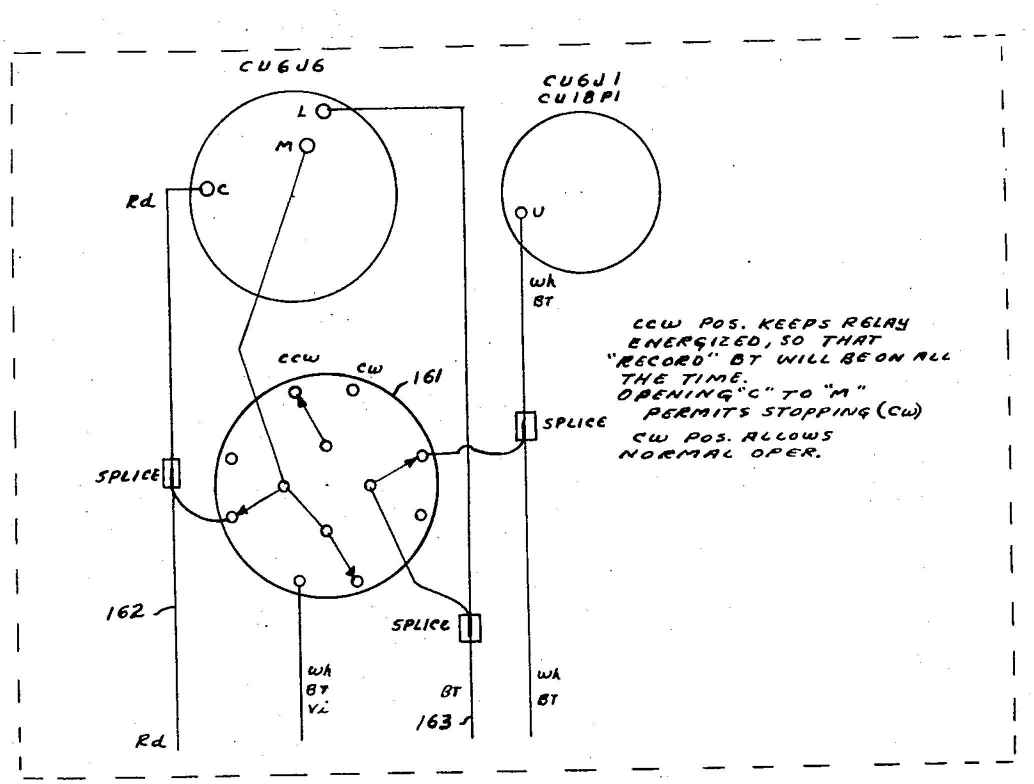
FIG. 16 is a schematic diagram showing the addition of a switch to a typical recorder to provide for operation of the record oscillators in the drive position and the lighting of the record light showing that the oscillators are energized.

FIG. 12 a schematic diagram of typical control circuitry, FIGS. 13 and 14 showing schematic diagrams of typical solid state logic circuits, and FIG. 15 showing the connections of a typical system as shown in the previous figures to a typical tape deck and counter are self-explanatory when comprehended in connection with the foregoing described logic system. FIG. 16 shows the addition of a conventional four pole two position rotary switch 161 to a conventional tape deck system such as the Ampex FR–100. As shown, only three poles of the switch are used. Generally, such a switch is required as most tape deck systems have a built-in safeguard that prevents accidental erasure or obliteration of the information on the tape during playback, rewind, and fast forward. In the particular tape deck being described, (i.e., the Ampex FR–100, as an example of a suitable tape deck for use with the apparatus of this invention), this safeguard is accomplished by interlocking relays so that operation of the "Drive" (playback) switch locks out the B+ supply for the record oscillators. The same safeguard is achieved when using this tape deck with the system of this invention by manually disconnecting the cable connecting the record oscillators to the record heads. It is necessary that the record oscillators be "on" so that they can furnish the held signal in the "oscillator hold" mode of operation of the system. (For use of the system in the "-conventional hold" mode this is not necessary.) The switch 161 in FIG. 16 causes the lock-out circuit to be by-passed by placing the B+ voltage on line 162 through connection M of plug CU6J6, and by placing the voltage on line 163 on terminal U of plug CU6J1 the "Record" light on the panel of the tape deck is energized when in the "drive" mode. When switch 161 is turned clockwise the original control circuit of the tape deck performs in an unaltered manner. The details of these changes in conventional tape decks may vary widely with different makes and models of tape recording and playback machines. The principals set forth herein will readily be adapted by those skilled in the art in applying the apparatus of this invention to other conventional equipments.

I claim:

1. The improvement in the control of a FM magnetic tape system having FM recording and playback apparatus including a recording oscillator and tape transport mechanism for moving the magnetic tape past the tape heads, the said system providing a programmed signal on playback operation from a prerecorded FM testing tape to a controller, the improvement comprising;

a. means for operating the recording oscillator of the said tape system in accord with the said program material on the prerecorded tape during playback operation;

b. means manually actuated for supplying a signal to the said transport mechanism for initiating a stopping of the tape;

c. means cooperating with the said recording oscillator for providing a holding signal to the controller, the said held signal being a signal substantially equivalent to the signal on the tape at the initiation of the stopping of the tape;

d. a preset counter for counting cycles of the FM signal on the magnetic tape and providing a control signal after a determined count;

e. means cooperating with the said manually actuated stopping means and the said counter for counting the FM cycles on the tape that passes the playback head, after the initiation of the manually actuated stopping means, until the tape comes to a stop;

f. means manually actuated cooperating with said said transport mechanism and the said counter for rewinding the tape a determined number of the prerecorded FM cycles on the tape;

g. means cooperating with the said tape transport mechanism and the said counter for restarting the tape in the forward direction; and h. means cooperating with the said counter and the said signal holding means for switching the signal to the controller from the signal held by the holding means to the programmed signal on the tape at the position on the tape at which the stop was initiated.

2. The apparatus as claimed in claim 1 wherein the said means for providing a holding signal includes an integrating operational amplifier.

3. The apparatus as claimed in claim 1 wherein the means for restarting the tape in the forward direction includes a manually actuated restart switch.

4. The apparatus as claimed in claim 1 wherein the means for operating the recording oscillator in accord with the program material on the tape includes means for disconnecting the said recording oscillator from the recording head.

5. The apparatus as claimed in claim 1 wherein the said apparatus operates from one channel of a multichannel tape system to control and provide held signals for each of the prerecorded channels.

* * * * *